US010145591B2

(12) United States Patent
Humburg

(10) Patent No.: US 10,145,591 B2
(45) Date of Patent: Dec. 4, 2018

(54) TEMPERATURE CONTROL UNIT, ESPECIALLY VEHICLE TEMPERATURE CONTROL UNIT

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 273 days.

(21) Appl. No.: 15/092,931

(22) Filed: Apr. 7, 2016

(65) Prior Publication Data

US 2016/0298880 A1 Oct. 13, 2016

(30) Foreign Application Priority Data

Apr. 9, 2015 (DE) .......... 10 2015 105 345

(51) Int. Cl.
*F25B 21/00* (2006.01)
*B60H 1/22* (2006.01)
*F24H 1/00* (2006.01)

(52) U.S. Cl.
CPC .......... *F25B 21/00* (2013.01); *B60H 1/2221* (2013.01); *F24H 1/00* (2013.01); *F25B 2321/002* (2013.01); *Y02B 30/66* (2013.01)

(58) Field of Classification Search
CPC .............. F25B 21/00; F25B 2321/022; F25B 2321/002; H02K 9/20; H02K 9/22; Y02B 30/66
See application file for complete search history.

(56) References Cited

U.S. PATENT DOCUMENTS

| 4,532,770 | A | 8/1985 | Hakuraku et al. |
| 2003/0106323 | A1 | 6/2003 | Zimm et al. |
| 2010/0146989 | A1* | 6/2010 | Egolf ............... F25B 21/00 62/3.1 |
| 2012/0272665 | A1* | 11/2012 | Watanabe ......... F25B 21/00 62/3.1 |

(Continued)

FOREIGN PATENT DOCUMENTS

| CN | 1977131 A | 6/2007 |
| CN | 103097834 A | 5/2013 |

(Continued)

*Primary Examiner* — Frantz Jules
*Assistant Examiner* — Steve Tanenbaum
(74) *Attorney, Agent, or Firm* — McGlew and Tuttle, P.C.

(57) ABSTRACT

A temperature control unit includes a ring-shaped magnetocaloric material temperature control body (28) over which heat transfer medium can flow, a rotatable temperature control body receiving housing (12), a temperature control body receiving space, temperature control sectors (I, II, III, IV) following each other in a circumferential direction, each with a cooling area (30) and a magnetic field heating area arranged next to the cooling area, in at least two adjacent temperature control sectors, a heat transfer medium circulation (40) from the magnetic field heating area of one sector to the cooling area of another sector and from the cooling area of the other sector to the magnetic field heating area of the one sector. In one sector, heat input fluid may flow through the cooling area—feeding heat into the sector or/and in one sector, heat discharge fluid may flow through the magnetic field heating area for discharging heat.

20 Claims, 4 Drawing Sheets

(56) References Cited

U.S. PATENT DOCUMENTS

2015/0089960 A1  4/2015  Takahashi et al.

FOREIGN PATENT DOCUMENTS

| EP | 1 736 717 A1 | | 12/2006 | |
|---|---|---|---|---|
| EP | 1736717 A1 | * | 12/2006 | ............ F25B 21/00 |
| JP | 2007147136 A | | 6/2007 | |
| JP | 2007147209 A | | 6/2007 | |
| JP | 2013 213653 A | | 10/2013 | |
| WO | 2004/059221 A1 | | 7/2004 | |

* cited by examiner

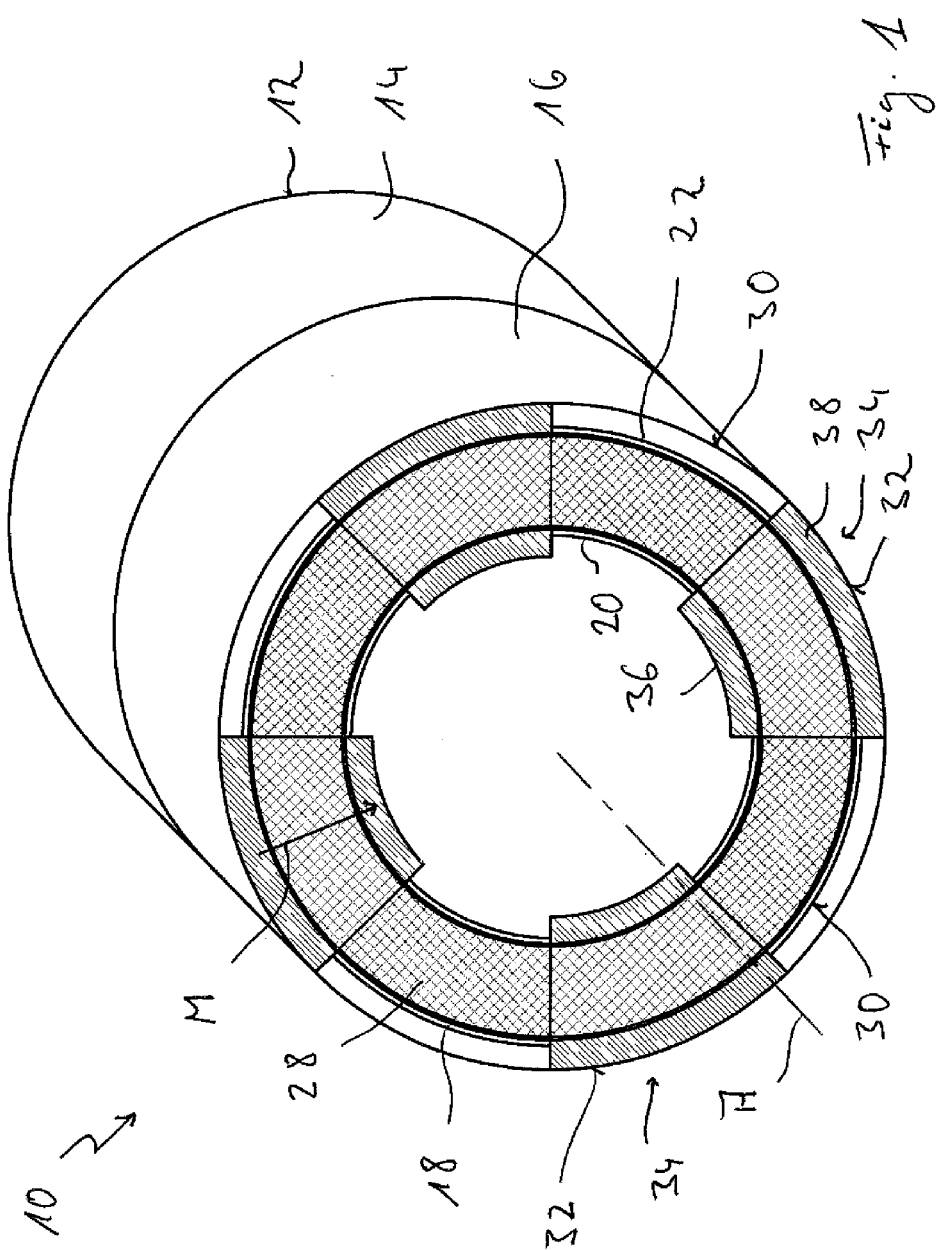

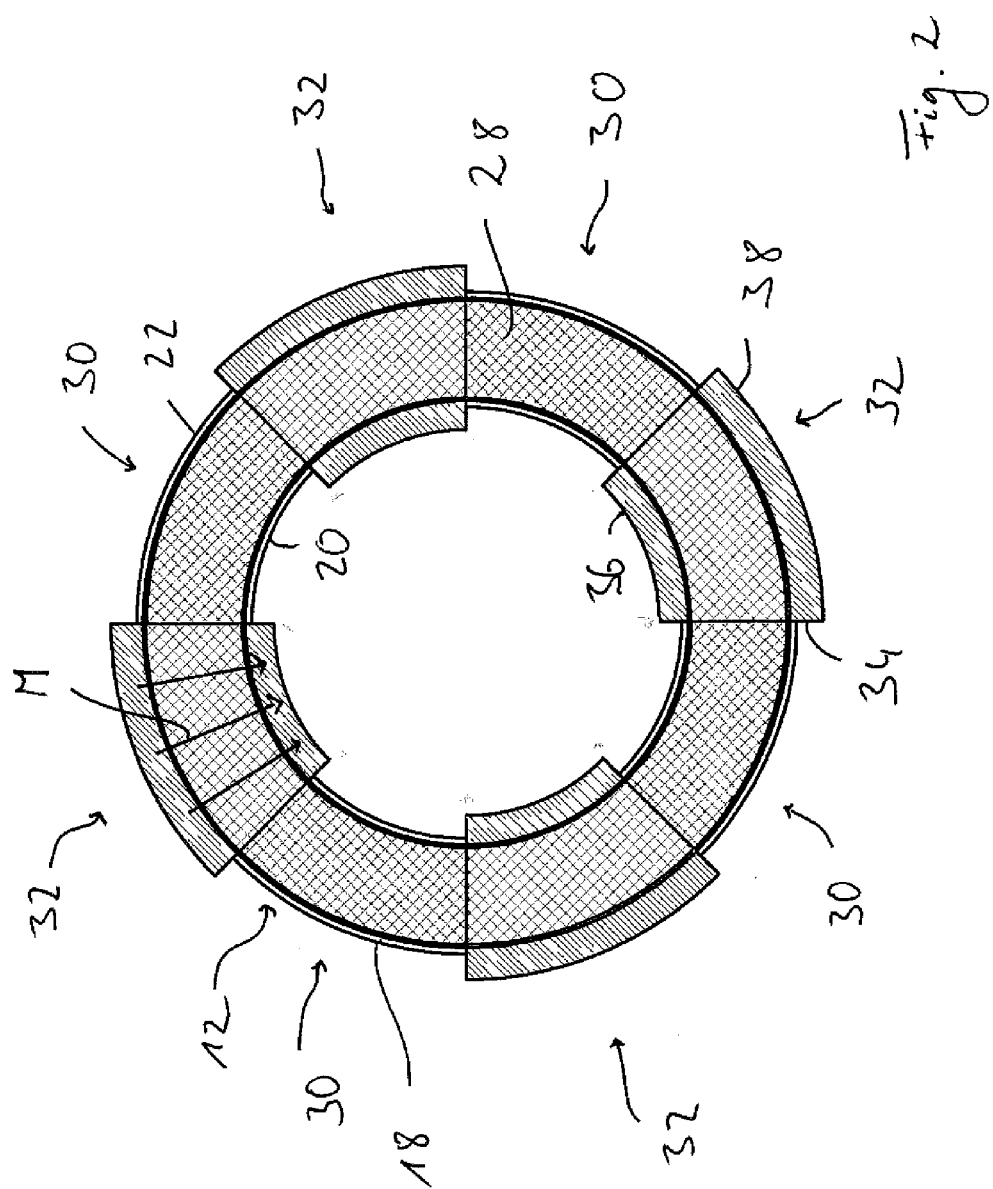

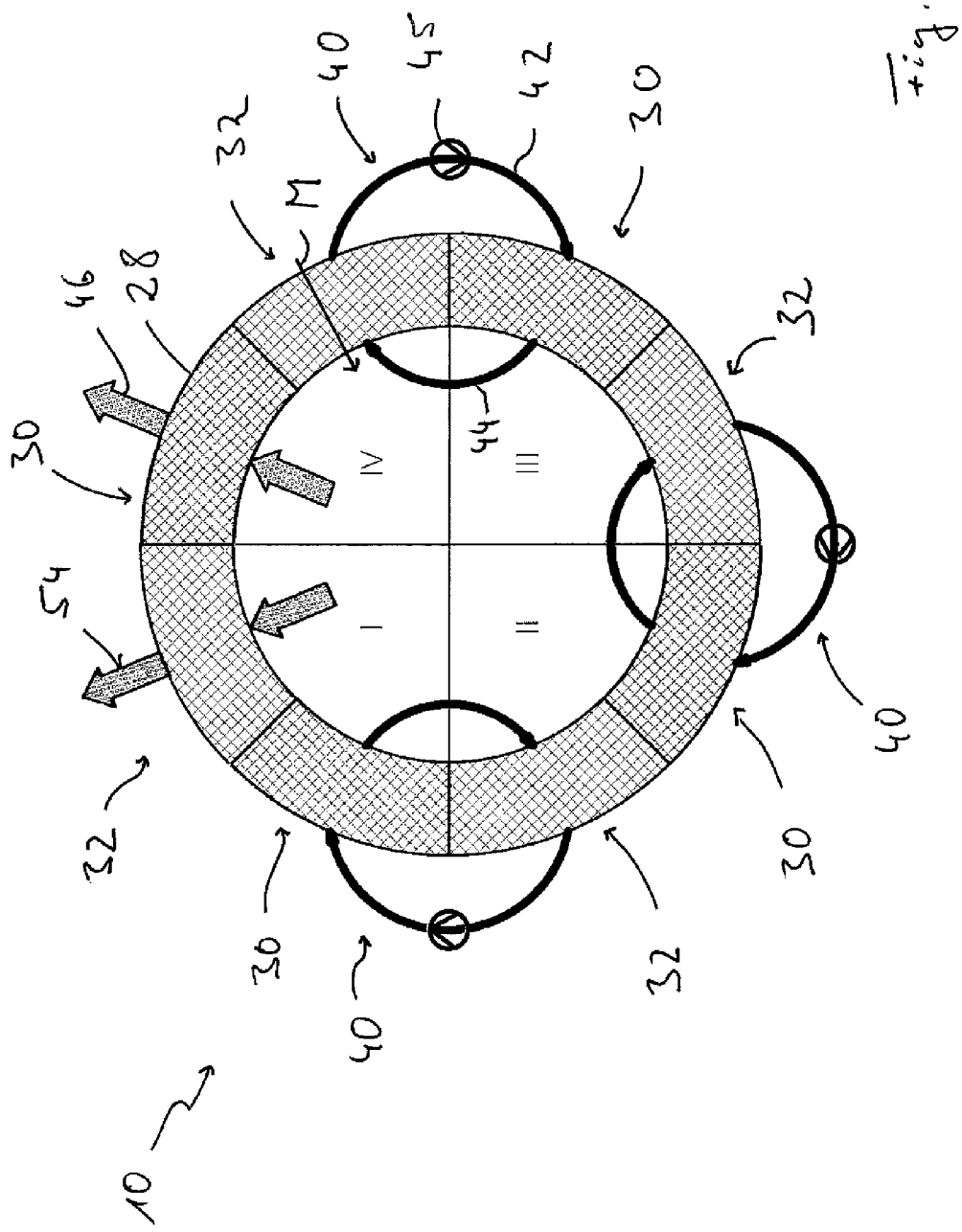

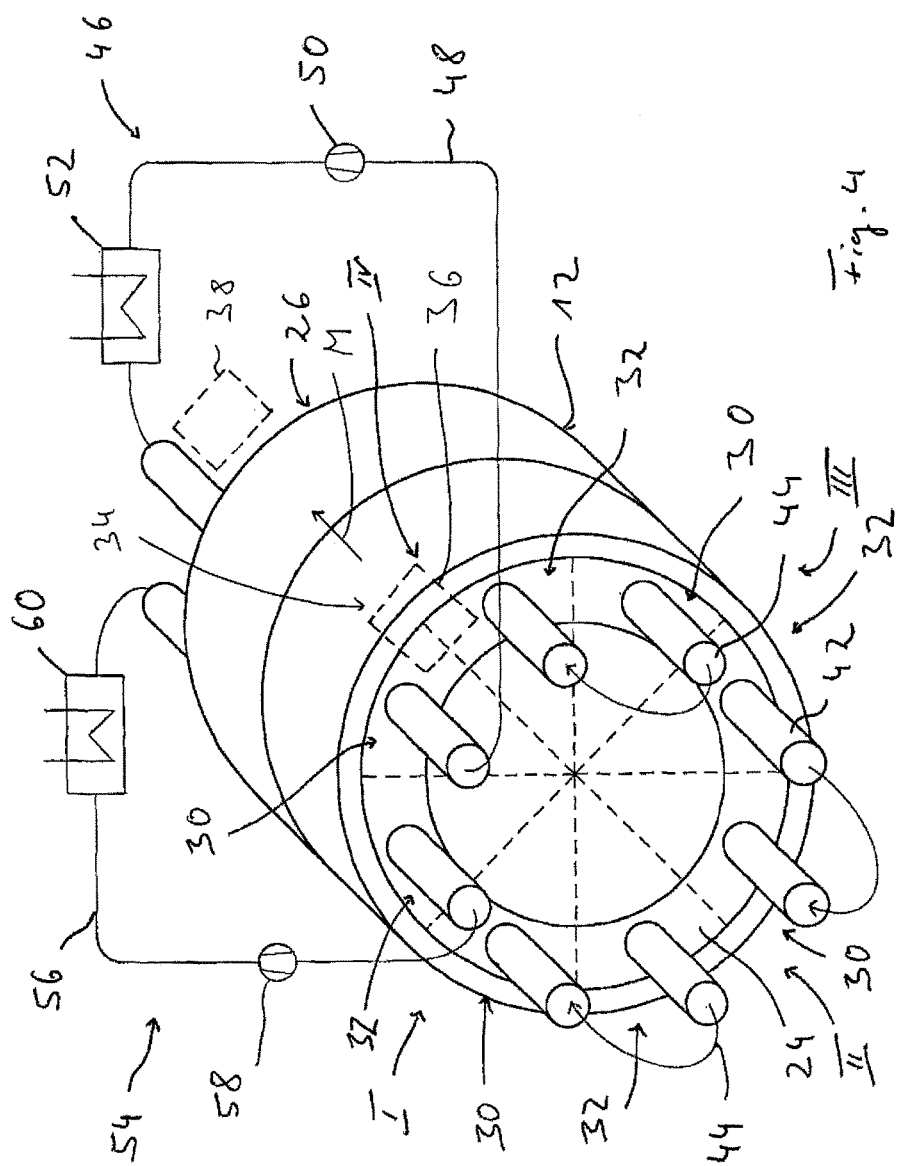

ature control unit, which can be used for cooling or heating, for example, a vehicle interior space by utilizing the magnetocaloric effect.

TEMPERATURE CONTROL UNIT, ESPECIALLY VEHICLE TEMPERATURE CONTROL UNIT

CROSS REFERENCE TO RELATED APPLICATIONS

This application claims the benefit of priority under 35 U.S.C. § 119 of German Patent Application 10 2015 105 345.4 filed Apr. 9, 2015, the entire contents of which are incorporated herein by reference.

FIELD OF THE INVENTION

The present invention pertains to a temperature control unit, especially a vehicle temperature control unit, which can be used for cooling or heating, for example, a vehicle interior space by utilizing the magnetocaloric effect.

BACKGROUND OF THE INVENTION

Magnetocaloric material is alternately moved into a magnetic field and out of the magnetic field in heat pumps that operate by utilizing the magnetocaloric effect. A spin alignment of the electrons of the magnetocaloric material takes place under the influence of the magnetic field during the moving into the magnetic field. This spin alignment or alignment of the magnetic moments in the magnetic field results in the magnetic entropy decreasing. Because the overall entropy of the system cannot decrease, a thermal entropy manifesting itself in a rise in temperature is increased. The reverse process takes place if the magnetocaloric material is moved out of the magnetic field. The temperature of a magnetocaloric material moved out of a magnetic field decreases.

Because only minor differences in temperature can be brought about by utilizing the magnetocaloric effect compared to thermodynamic processes used in conventional cooling devices or heat pumps, it is necessary to carry out multistage processes, in which a successive temperature change is obtained by means of connecting in series a plurality of systems using the magnetocaloric effect, for providing a temperature change of the magnetocaloric material exceeding these temperature differences or of a fluid absorbing heat from said magnetocaloric material.

SUMMARY OF THE INVENTION

An object of the present invention is to provide a temperature control unit operating by utilizing the magnetocaloric effect, especially a vehicle temperature control unit, which can be operated with a simple and compact design for obtaining greater temperature changes.

This object is accomplished according to the present invention by means of a temperature control unit, especially a vehicle temperature control unit, comprising a preferably ring-shaped (or annular) temperature control body, which is made of magnetocaloric material and through which or/and around which heat transfer medium can flow, a temperature control body receiving housing with a temperature control body space, which receives the temperature control body rotating about an axis of rotation, a plurality of temperature control sectors following each other in the circumferential direction, each with a cooling area and with a magnetic field heating area arranged in the circumferential direction next to the cooling area, in at least two adjacent temperature control sectors a heat transfer medium circulation from the magnetic field heating area of one of these temperature control sectors to the cooling area of the other of these temperature control sectors and from the cooling area of the other of these temperature control sectors to the magnetic field heating area of the one of these temperature control sectors, wherein in at least one temperature control sector, heat input fluid is able to flow through the cooling area for feeding heat into this temperature control sector or/and wherein in at least one temperature control sector, heat discharge fluid is able to flow through the magnetic field heating area for discharging heat from this temperature control sector.

The temperature control unit according to the present invention may operate, in the manner of a heat pump, by utilizing the magnetocaloric effect in order to cool the heat input fluid, on the one hand, and to heat the heat discharge fluid, on the other hand, by means of thermal interaction. Thus, heat is transferred from the heat input fluid to the heat discharge fluid. Depending on whether the temperature control unit according to the present invention shall be used as a heating device or as a cooling device, the heat input fluid may be used in an associated heat exchanger arrangement in order to cool another medium, for example, the air to be introduced into a vehicle interior space, or the heat discharge fluid may be used, for example, to heat the air to be introduced into a vehicle interior space. Because the efficiency of the temperature control unit according to the present invention increases with increasing temperature, especially of the heat input fluid, the use as a cooling device, i.e., for example, as a vehicle air conditioner, is particularly advantageous.

In order to provide the magnetic interaction necessary for generating the magnetocaloric effect, it is suggested that in association with each magnetic field heating area, a magnet array be provided for generating a magnetic field penetrating the magnetic field heating area.

For an efficient magnetic interaction, on the one hand, and an efficient discharge or feed of heat, on the other hand, provisions may be made in this case for the magnet array to be arranged in at least one temperature control sector for generating a magnetic field oriented essentially radially or/and for the heat transfer medium circulation to be designed for generating a heat transfer medium flow flowing essentially axially through the magnetic field heating area and the cooling area.

As an alternative or in addition, provisions may be made for the magnet array to be arranged in at least one temperature control sector for generating an essentially axially oriented magnetic field or/and for the heat transfer medium circulation to be designed for generating a heat transfer medium flow flowing essentially radially through the magnetic field heating area and the cooling area.

In order to be able to provide the exchange of heat between a cooling area and an adjacent magnetic field heating area in a simple manner, it is suggested that at least one first circulation line leading from the magnetic field heating area to the cooling area and at least one second circulation line leading from the cooling area to the magnetic field heating area and a circulating pump be provided for providing a heat transfer medium circulation in at least two adjacent temperature control sectors.

For providing the temperature control body receiving space in the temperature control body receiving housing, it is suggested that the temperature control body receiving housing comprise a first housing circumferential wall defining the temperature control body receiving space on a first radial side in a first radial direction, preferably radially inwards, and a second housing circumferential wall defining the temperature control body receiving space on a second radial side in a second radial direction, preferably radially outwards. Furthermore, provisions may be made for the temperature control body receiving housing to comprise a first housing front wall defining the temperature control body receiving space on a first axial side in a first axial direction and a second housing front wall defining the temperature control body receiving space on a second axial side in a second axial direction opposite the first axial direction. In this way, a design is created, in which the temperature control body is essentially fully encapsulated and thus the heat transfer fluid can also flow through the heat transfer circulations in the outward direction without the risk of leaks.

In order to be able to set or orient the magnetic field needed for generating the magnetocaloric effect in a defined manner, it is suggested that the magnet array comprise at least one first magnet on a first radial side or/and on a first axial side in relation to the temperature control body receiving space and at least one second magnet on a second radial side or/and on a second axial side in relation to the temperature control body receiving space. In particular, the magnetic field can be generated in such a design by using one or more permanent magnets in each case.

For making use of the heat pump effect used in the temperature control unit according to the present invention, it is suggested that a heat exchanger arrangement through which the heat discharge fluid can flow be provided for the discharge of heat from the heat discharge fluid, or/and that a heat exchanger arrangement through which heat input fluid can flow be provided for absorbing heat in the heat input fluid.

According to an additional aspect of the present invention, the object mentioned in the introduction is accomplished by a temperature control unit, especially a vehicle temperature control unit, comprising a preferably ring-shaped temperature control body, which is made of magnetocaloric material and through which or/and around which heat transfer medium is able to flow, a temperature control body receiving housing with a temperature control body receiving space, which receives the temperature control body rotating about an axis of rotation, a plurality of cooling areas and magnetic field heating areas alternately following each other in the circumferential direction, wherein heat input fluid is able to flow through at least one cooling area, heat discharge fluid is able to flow through at least one magnetic field heating area, and a heat transfer medium circulation from the cooling area to the magnetic field heating area and from the magnetic field heating area to the cooling area is provided in at least one cooling area and one magnetic field heating area adjacent to this cooling area.

Because of the alternating sequence of cooling areas and magnetic field heating areas, a multistage heat pump process can be provided, in which a cooling area and an adjacent magnetic field heating area each can interact for providing a cycle with adiabatic heating caused by magnetic interaction and subsequent adiabatic cooling in the corresponding cooling area.

In particular, provisions may be made in this connection for the cooling area through which the heat input fluid can flow and the magnetic field heating area through which the heat discharge fluid can flow to be arranged adjacent to one another.

It should be pointed out that such a design with cooling areas and magnetic field heating areas alternately following each other in the circumferential direction may be designed alone or combined with all groups of features explained above.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of a temperature control unit utilizing the magnetocaloric effect, shown open;

FIG. 2 is an axial view of the temperature control unit of FIG. 1;

FIG. 3 is a schematic diagram, which illustrates the heat pump effect proceeding in a plurality of process stages in the temperature control unit of FIG. 1; and FIG. 4 is a perspective view of the temperature control unit, in which the various fluid flows are illustrated.

DESCRIPTION OF THE PREFERRED EMBODIMENTS

Referring to the drawings, a temperature control unit, which can be used, for example, for thermal conditioning, and especially for cooling, a vehicle interior space, is generally designated by 10 in the figures. The temperature control unit 10 shown in perspective view in FIG. 1 comprises a temperature control body receiving housing 12, which can be formed, for example, from two housing shells 14, 16, which are constructed essentially identical to one another and arranged following each other in the direction of a housing axis A. The housing 12 or each of the housing shells 14, 16 is configured with a first housing circumferential wall 20 defining radially inwards and a second housing circumferential wall 22 defining radially outwards a temperature control body receiving space designated generally by 18 and having a, for example, cylindrical design. The temperature control body receiving space 18 may be completed, for example, by ring-shaped housing front walls 24 and 26 connecting the first housing circumferential wall 20 and the second housing circumferential wall 22, respectively, at the two axial ends of the temperature control body receiving housing 12.

A temperature control body 28 has a shape adapted to the shape of the temperature control body receiving space 18 and which thus has, for example, a likewise essentially cylindrical design. The temperature control body 28 is received in the thus essentially fluidproof, encapsulated temperature control body receiving space 18 rotating about the housing axis A. In the essentially stationary temperature control body receiving housing 12, the temperature control body 28 can be driven for rotation by an electric motor drive, for example, also integrated into this housing. This drive may comprise, for example, a stator assembly of an electric motor in an axial end area of the temperature control body receiving housing 12 and a rotor assembly of an electric motor in the associated axial end area of the temperature control body 28. The rotor assembly is rotatable about the housing axis A with the temperature control body 28. The temperature control body 28 is made of magnetocaloric material. Such magnetocaloric material is characterized in that because of the alignment of the magnetic moments in the material taking place during the movement of same into a magnetic field, a heating of same material occurs, while cooling takes place when the magnetocaloric material is moved out of the magnetic field. Due to the alternating movement into a magnetic field and out of a magnetic field, a cycle may be generated, in which heat is extracted from the magnetocaloric material located and heated in the magnetic field and heat is fed to the magnetocaloric material positioned outside the magnetic field and is thus at a lower temperature level. This cycle makes possible the use of a temperature control unit 10 having such a design as a heat pump.

In order to discharge heat from the temperature control body 28 or to feed heat to the temperature control body 28, a fluid, generally a liquid, flows around or flows through same. For this, the temperature control body 28 may be provided with a porous structure or a structure designed with flow openings or with channels so that, as will be explained below, a fluid flowing through the temperature control body receiving space 18 can discharge heat from the temperature control body 28 or input heat into same.

The generally circular-ring-shaped structure of the temperature control unit 10 is divided into a total of four temperature control sectors I through IV in the exemplary embodiment shown in the figures as well as shown in FIG. 3. Each of the temperature control sectors I through IV comprises a cooling area 30 and a magnetic field heating area 32 arranged following each other or next to one another about the housing axis A in the circumferential direction. An alternating circumferential sequence of cooling areas 30 and magnetic field heating areas 32 of the four temperature control sectors I through IV is thus obtained.

As can be seen in FIGS. 1 and 2, a magnet array, which is generally designated by 34, is associated with each of the total of four magnetic field heating areas 32. Each of these magnet arrays 34 may be designed, for example, with one or more magnets 36, especially permanent magnets, each arranged in the area of the first housing circumferential wall 20, as well as one or more magnets 38, especially permanent magnets, arranged in the area of the second housing circumferential wall 22, i.e., radially outside the temperature control body 28. Thus, in association with each of the magnetic field heating areas 32, a magnetic field M essentially radially penetrating this magnetic field heating area may be provided.

In case of each of the temperature control sectors I through IV, that are adjacent in the circumferential direction, a heat transfer medium circulation (heat transfer medium circulation arrangement), which is generally designated by 40, is provided between the cooling area 32 of one of these temperature control sectors and the magnetic field heating area 32 of the other of these temperature control sectors. This circulation arrangement 40 comprises a first circulation line 42 leading from a particular magnetic field heating area to an adjacent cooling area and a second circulation line 44 leading from this cooling area 30 to the magnetic field heating area 32. A circulating pump 45, which can be operated for maintaining the circulation of the heat transfer medium, may be provided in one of the circulation lines, for example, the first circulation line 42. As FIG. 3 shows this, in case of dividing into a total of four temperature control sectors I through IV, a total of three such heat transfer medium circulations 40 are provided following each other in the circumferential direction. In this case, the structural design may be such that the heat transfer medium circulating in a corresponding heat transfer medium circulation 40 essentially flows through in the direction of the housing axis A, i.e., essentially in a direction that is at right angles to the direction of the magnetic field M provided in the magnetic field heating area 32. For this, for example, the first and second circulation lines 42, 44 may each discharge into the temperature control body receiving space 18 in the area of the first housing front wall 24 or the second housing front wall 26. It should be pointed out that the various fluid circulations 40 are not separated from one another in the circumferential direction in the temperature control body receiving space 18. These fluid circulations 40 are essentially provided or designed by fluid entering a defined circumferential area in the temperature control body receiving space 18 and thus also the temperature control body 28 and, at the other axial end, fluid in the same circumferential area exiting from the temperature control body 28 and the temperature control body receiving space 18 during the rotation of the temperature control body 28 in the temperature control body receiving space 18.

A circulation arrangement of a heat input fluid which is generally designated by 46 is provided in association with the cooling area 30 of the temperature control sector IV. This circulation arrangement 46 comprises a circulation line 48, which discharges into the area of the cooling area 30 of the temperature control sector IV at the housing end faces 24 and 26 in the temperature control body receiving space 18, such that in this circumferential area, heat input fluid can be introduced into the temperature control body receiving space 18 and thus the temperature control body 28 and can also be removed therefrom. In order to drive the heat input fluid so as to circulate, a circulating pump 50 is provided in the circulation line 48. Further, a heat exchanger arrangement 52 is provided, in which the heat input fluid flowing in the circulation line 48 can absorb heat. For example, a thermal interaction may take place between the air to be introduced into a vehicle interior space and the heat input fluid circulating in the circulation line 48.

A circulation arrangement 54 of heat discharge fluid is provided in association with the magnetic field heating area 32 of the temperature control sector I, which area is directly adjacent to the cooling area 30 of the temperature control sector IV. This circulation arrangement 54 comprises a circulation line 46 that discharges into the temperature control body receiving space 18 in the area of the magnetic field heating area 32 of the temperature control sector I at the two housing end faces 24, 26 such that a flow of heat discharge fluid penetrating or/and flowing about the temperature control body 28 can be generated in this circumferential area. A circulating pump 58 is provided in the circulation line 56 in order to drive the heat discharge fluid to the circulation. Further, a heat exchanger arrangement 60 is provided in the circulation line 56. In this heat exchanger arrangement 60, the heat discharge fluid flowing in the circulation line 56 can be transferred to a different medium, for example, the ambient air outside a vehicle interior space.

Because of the above-mentioned absence of separation in terms of flow of the heat transfer medium circulations 40 from one another or even with regard to the circulation 46 of the heat input fluid or the circulation 54 of the heat discharge fluid, the same fluid, and especially the same liquid, is used for the heat transfer medium circulating in the various heat transfer medium circulations 40 as for the circulation 46 and the circulation 54. In particular, water may be used as fluid in a particularly advantageous embodiment.

The operation of the temperature control unit 10 for cooling the air brought into thermal interaction with the fluid circulating in the circulation 46, which air shall be fed into a vehicle interior space, in the area of the heat exchanger arrangement 52, shall be described below. It should first be assumed for this that all system areas and also the fluid circulating in various areas are at the same temperature during the startup of the temperature control unit 10, and that the temperature control body 28, which has a ring-shaped design, rotates counterclockwise in the temperature control body receiving space 18.

If that circumferential area of the temperature control body 28, which is positioned in the cooling area 30 of the temperature control sector IV in this initial state, is considered first, then at the start of the rotation of the temperature control body 28, this circumferential area will move counterclockwise into the magnetic field heating area 32 of the temperature control sector I. Because of the physical effect of the spin alignment in the magnetic field M present in the magnetic field heating area 32 already explained above, the area of the temperature control body 28 entering this magnetic field heating area 32 is heated. Therefore, it will have a temperature that is above the temperature of the heat discharge fluid flowing in the circulation 54, which is at the ambient temperature level. This means that the heat discharge fluid absorbs heat from the temperature control body 28 and transfers this heat in the area of the heat exchanger arrangement 60 to the ambient air, which is, for example, likewise at the initial temperature level.

Correspondingly, an area of the ring-shaped temperature control body 28 positioned beforehand in the magnetic field heating area 32 of the temperature control sector IV is moved into the cooling area 30 of the temperature control sector IV at the start of the process. Since this area of the temperature control body 28 is moved out of the magnetic field M present in the magnetic field heating area 32 of the temperature control sector IV in this case, the spin alignment is lost and the temperature control body 28 is cooled locally. This means that the heat input fluid flowing in the circulation 46 is also cooled and heat is transferred to the temperature control body 28. The heat input fluid leaving the temperature control body receiving space 18 compared to the initially present ambient temperature flows through the heat exchanger arrangement 52 and hereby absorbs heat from the air being at a higher temperature level, i.e., first at an ambient temperature level and to be introduced into a vehicle interior space. This air is thus cooled and can be introduced in the cooled state into the vehicle interior space.

A corresponding process takes place between the magnetic field heating area 32 of the temperature control sector I and the cooling area 30 of the temperature control sector IV in the area of each of the circulations 40 following one another in the circumferential direction. Each circumferential area of the temperature control body 28 entering a magnetic field heating area 32 is heated and each circumferential area of the temperature control body 28 entering a cooling area 30 is cooled. In order to generate the above-mentioned cycle with the transfer of heat by means of a heat transfer medium in this connection, the circulations 40 are provided such that such cycles are connected in series in a plurality of stages and a temperature change, especially a decrease in temperature of the temperature control body 28 during its counterclockwise movement can be brought about in each of the cycles following one another in the circumferential direction. The temperature changes generated in the consecutive cycles are added or combined into a total temperature change. This means that because of these series-connected cycles, heat is transferred from the heat input fluid in the circulation 46 to the heat discharge fluid in the circulation 54, which ultimately means that heat from the air to be introduced into the vehicle interior space is transferred to the ambient air located outside the vehicle.

Because of the rotation of the temperature control body 28 in the temperature control body receiving space 18, an alternating heating and cooling process of the temperature control body 28 takes place in the temperature control sectors I through IV following each other. In order to make possible a sufficient thermal interaction of the heat transfer medium flowing through the particular temperature control sectors I through IV with the magnetocaloric material of the temperature control body 28 present therein during the rotation of the temperature control body 28, the rotary operation of the temperature control body 28 may take place intermittently and with variable speed of rotation. It can thus be guaranteed that whenever a section of the temperature control body 28, which section corresponds, for example, in its circumferential extension to the circumferential extension of a magnetic field heating area or of a cooling area and has moved into a cooling area or magnetic field heating area following in the circumferential direction, the heat transfer medium can transfer heat from the part of the temperature control body 28 positioned in such a state in a magnetic field heating area or can feed heat, correspondingly, into the temperature control body 28 in the cooling areas due to the temporary lowering of the speed of rotation of the temperature control body 28 or due to temporary stopping of the temperature control body 28. Between such heat exchange phases with lower speed of rotation or non-rotating temperature control body 28, the temperature control body is moved further in phases of movement until a part of the temperature control body 28, which has been, for example, previously positioned essentially in the area of a magnetic field heating area, is positioned in a cooling area then following in the circumferential direction. The duration of the phases during which the temperature control body does not rotate or rotates with lower speed can be selected such that the necessary heat transfer takes place between the temperature control body and the heat transfer medium.

In this case, of course, the series connection of more or fewer than four such temperature control sectors by means of correspondingly different division and heat transfer medium circulations generated in connection therewith may also be provided. Also, the cooling areas and magnetic field heating areas following each other in the circumferential direction do not necessarily have to each be designed with circumferential extension identical to one another. Further, the temperature control device may, of course, also be used for heating the air to be introduced, for example, into a vehicle interior space. In this case, the air interacting thermally with the heat discharge fluid in the area of the heat exchanger arrangement 60 is conducted into the vehicle interior space or removed from the vehicle interior space rather than the air interacting thermally with the heat input fluid in the area of the heat exchanger arrangement 52. However, since the multistage, consecutive cycles described above run more efficiently at a higher temperature level of the heat transfer medium and of the heat discharge fluid and of the heat input fluid, the temperature control unit according to the present invention is especially suitable for cooling, i.e., for use as a vehicle air conditioner, at higher ambient temperatures.

The positioning of the magnet arrays 34 shown in the figures and the essentially radial orientation of the magnetic field brought about thereby in case of corresponding axial flow through the temperature control body receiving space 18 is particularly advantageous especially for providing comparatively greater magnetic field strengths, because a great field strength can be generated by means of the magnets 34, 36 located radially opposite one another because of their comparatively close positioning to one another. Nevertheless, it is absolutely possible to arrange magnets, as an alternative or in addition, in the area of the housing end faces 24, 26 such that, in principle, an essentially axially oriented magnetic field is generated by each of the magnet arrays 34. The circulation lines connected there could each equally feed or discharge the circulating fluid radially in the area of the different cooling areas or magnetic field heating areas.

While specific embodiments of the invention have been shown and described in detail to illustrate the application of the principles of the invention, it will be understood that the invention may be embodied otherwise without departing from such principles.

What is claimed is:

1. A temperature control unit comprising:
   a temperature control body formed of magnetocaloric material and through which or around which or both through and around which heat transfer medium can flow;
   a temperature control body receiving housing with a temperature control body receiving space receiving the temperature control body for rotation of the temperature control body about an axis of rotation;
   a plurality of temperature control sectors of the magnetocaloric material and following each other in a circumferential direction of the temperature control body, each of the control sectors comprising a cooling area and a magnetic field heating area arranged in the circumferential direction next to the cooling area, each magnetic field heating area having associated therewith a magnet array generating a magnetic field penetrating the magnetic field heating area, whereby a circumferential sequence, of alternately arranged cooling areas and magnetic field heating areas, is provided; and
   a heat transfer medium circulation, in at least two adjacent temperature control sectors, from the magnetic field heating area of one of the temperature control sectors to the cooling area of the other of the temperature control sectors and from the cooling area of the other of the temperature control sectors to the magnetic field heating area of the one of the temperature control sectors, wherein:
   in at least one temperature control sector heat input fluid flows through the cooling are, for feeding heat into the temperature control sector; or
   in at least one temperature control sector heat discharge fluid flows through the magnetic field heating area, for discharging heat from the temperature control sector; or
   in at least one temperature control sector heat input fluid flows through the cooling area, for feeding heat into the temperature control sector and in at least one temperature control sector heat discharge fluid flows through the magnetic field heating area, for discharging heat from the temperature control sector.

2. A temperature control unit in accordance with claim 1, wherein:
   the magnet array is arranged in association with at least one of the temperature control sectors for generating an essentially radially oriented magnetic field; or
   the heat transfer medium circulation is configured for generating a heat transfer medium flow flowing essentially axially through the magnetic field heating area and essentially axially through the cooling area or
   the magnet array is arranged association with at least one of the temperature control sectors for generating an essentially radially oriented magnetic field and the heat transfer medium circulation is configured for generating a heat transfer medium flow flowing essentially axially through the magnetic field heating area and essentially axially through the cooling area.

3. A temperature control unit in accordance with claim 1, wherein:
   the magnet array is arranged association with at least one temperature control sector for generating an essentially axially oriented magnetic field; or
   the heat transfer medium circulation arrangement is configured for generating a heat transfer medium flow flowing essentially radially through the magnetic field heating area and the cooling area; or
   the magnet array is arranged association with at least one temperature control sector for generating an essentially axially oriented magnetic field and the heat transfer medium circulation arrangement is configured for generating a heat transfer medium flow flowing essentially radially through the magnetic field heating area and the cooling area.

4. A temperature control unit in accordance with claim 1, wherein the heat transfer medium circulation arrangement comprises in association with at least two adjacent temperature control sectors:
   at least one first circulation line leading from the magnetic field heating area of one of the at least two adjacent temperature control sectors to the cooling area;
   at least one second circulation line leading from the cooling area of one of the at least two adjacent temperature control sectors to the magnetic field heating area; and
   a circulating pump circulating heat transfer medium through the at least one first circulation line and the at least one second circulation line.

5. A temperature control unit in accordance with claim 1, wherein the temperature control body receiving housing comprises:
   a first housing circumferential wall defining the temperature control body receiving space on a first radial side in a first radially inwards direction; and
   a second housing circumferential wall defining the temperature control body receiving space on a second radial side in a second radially outwards direction.

6. A temperature control unit in accordance with claim 5, wherein the temperature control receiving housing comprises
   a first housing front wall defining the temperature control body receiving space on a first axial side in a first axial direction; and
   a second housing front wall defining the temperature control body receiving space on a second axial side in a second axial direction opposite the first axial direction.

7. A temperature control unit in accordance with claim 1, wherein:
   the magnet array comprises at least one first magnet on a first radial side or on a first axial side in association with the temperature control body receiving space; and
   at least one second magnet on a second radial side or on a second axial side in association with the temperature control body receiving space.

8. A temperature control unit in accordance with claim 1, further comprising:
- a discharge heat exchanger arrangement through which heat discharge fluid is able to flow, the discharge heat exchanger arrangement discharging heat from the heat discharge fluid; or
- a input heat exchanger arrangement through which heat input fluid is able to flow, the input heat exchanger arrangement absorbing heat in the heat input fluid; or
- a discharge heat exchanger arrangement through which heat discharge fluid is able to flow, the discharge heat exchanger arrangement discharging heat from the heat discharge fluid and a input heat exchanger arrangement through which heat input fluid is able to flow, the input heat exchanger arrangement absorbing heat in the heat input fluid.

9. A vehicle temperature control unit comprising:
- a temperature control body made of magnetocaloric material and through which or around which or both through which and around which heat transfer medium flows;
- a temperature control body receiving housing defining a temperature control body receiving space, the temperature control body being rotatably received, for rotation about an axis of rotation, within the temperature control body receiving space;
- a plurality of magnet arrays, each magnetic array generating a magnetic field penetrating the magnetocaloric material to provide a magnetic field heating area, whereby a plurality of cooling areas and magnetic field heating areas alternately follow each other in the circumferential direction whereby a circumferential sequence of alternately arranged cooling areas and magnetic field heating areas is provided, wherein heat input fluid flows through at least one cooling area and heat discharge fluid flows through at least one magnetic field heating area; and
- a heat transfer medium circulation arrangement fluidically connecting at least one cooling area to at least one magnetic field heating area and fluidcally connecting at least one magnetic field heating area to at least one cooling area.

10. A vehicle temperature control unit in accordance with claim 9, wherein the cooling area through which heat input fluid flows and the magnetic field heating area through which discharge fluid flows are arranged adjacent to one another.

11. A vehicle temperature control unit in accordance with claim 9, further comprising a temperature control body drive for rotation of the temperature control body relative to the temperature control body receiving housing.

12. A vehicle temperature control unit comprising:
- a temperature control body receiving housing defining a temperature control body receiving space;
- a temperature control body formed of magnetocaloric material and through which or around which or both through and around which heat transfer medium flows, the control body being rotatably received in the temperature control body receiving space for rotation of the temperature control body about an axis of rotation;
- a plurality of magnet arrangements, each of the magnet arrangements being associated with one of a plurality of temperature control sectors following each other in a circumferential direction of the temperature control body, each of the control sectors being provided at the temperature control body and comprising a cooling area and a magnetic field heating area with the associated magnet arrangement generating a magnetic field penetrating the magnetic field heating area to heat same, each magnetic field heating area being arranged in the circumferential direction adjacent to one of the cooling areas whereby a circumferential sequence of alternately arranged cooling areas and magnetic field heating areas is provided on the temperature control body; and
- a heat transfer medium circulation arrangement fluidically connected to at least two adjacent temperature control sectors providing heat transfer medium circulation from the magnetic field heating area of one of the temperature control sectors to the cooling area of another of the temperature control sectors and from one of the cooling areas of one of the temperature control sectors to one of the magnetic field heating areas of one of the temperature control sectors, wherein:
- in at least one temperature control sector heat input fluid flows through the cooling area for feeding heat into the at least one temperature control sector; or
- in at least one temperature control sector heat discharge fluid flows through the magnetic field heating area for discharging heat from the at least one temperature control sector; or
- in at least one temperature control sector heat input fluid flows through the cooling area for feeding heat into the at least one temperature control sector and heat discharge fluid flows through the magnetic field heating area for discharging heat from the at least one temperature control sector.

13. A vehicle temperature control unit in accordance with claim 12, wherein:
- the magnet array is arranged in at least one of the temperature control sectors for generating an essentially radially oriented magnetic field; or
- the heat transfer medium circulation is configured for generating a heat transfer medium flow flowing essentially axially through the magnetic field heating area and essentially axially through the cooling area or
- the magnet array is arranged in at least one of the temperature control sectors for generating an essentially radially oriented magnetic field and the heat transfer medium circulation is configured for generating a heat transfer medium flow flowing essentially axially through the magnetic field heating area and essentially axially through the cooling area.

14. A vehicle temperature control unit in accordance with claim 12, wherein:
- each magnet arrangement comprises a magnet array;
- each magnet array is arranged to act on at least one temperature control sector for generating an essentially radially oriented magnetic field;
- the heat transfer medium circulation arrangement is configured for generating a heat transfer medium flow flowing essentially axially through the magnetic field heating area and essentially axially through the cooling area.

15. A vehicle temperature control unit in accordance with claim 12, wherein the heat transfer medium circulation arrangement comprises in at least two adjacent temperature control sectors:
- at least one first circulation line leading from the magnetic field heating area to the cooling area;
- at least one second circulation line leading from the cooling area to the magnetic field heating area; and
- a circulating pump.

16. A vehicle temperature control unit in accordance with claim 12, wherein the temperature control body receiving housing comprises:
- a first housing circumferential wall defining the temperature control body receiving space on a first radial side in a first radially inwards direction; and
- a second housing circumferential wall defining the temperature control body receiving space on a second radial side in a second radially outwards direction.

17. A vehicle temperature control unit in accordance with claim 16, wherein the temperature control receiving housing comprises:
- a first housing front wall defining the temperature control body receiving space on a first axial side in a first axial direction; and
- a second housing front wall defining the temperature control body receiving space on a second axial side in a second axial direction opposite the first axial direction.

18. A vehicle temperature control unit in accordance with claim 12, wherein:
- each magnet arrangement comprises a magnet array;
- each magnet array comprises at least one first magnet on a first radial side or on a first axial side in association with the temperature control body receiving space; and
- at least one second magnet on a second radial side or on a second axial side in association with the temperature control body receiving space.

19. A vehicle temperature control unit in accordance with claim 12, further comprising:
- a discharge heat exchanger arrangement through which heat discharge fluid is able to flow, the discharge heat exchanger arrangement discharging heat from the heat discharge fluid; or
- an input heat exchanger arrangement through which heat input fluid is able to flow, the input heat exchanger arrangement absorbing heat in the heat input fluid; or
- a discharge heat exchanger arrangement through which heat discharge fluid is able to flow, the discharge heat exchanger arrangement discharging heat from the heat discharge fluid and a input heat exchanger arrangement through which heat input fluid is able to flow, the input heat exchanger arrangement absorbing heat in the heat input fluid.

20. A vehicle temperature control unit in accordance with claim 12, further comprising a temperature control body drive for rotation of the temperature control body relative to the temperature control body receiving housing.

* * * * *